United States Patent
Takahashi et al.

(10) Patent No.: US 12,123,802 B2
(45) Date of Patent: Oct. 22, 2024

(54) METHOD FOR MEASURING LIGHT TRANSMISSION MEDIUM, DEVICE FOR MEASURING LIGHT TRANSMISSION MEDIUM, PROGRAM FOR MEASURING LIGHT TRANSMISSION MEDIUM, AND RECORDING MEDIUM

(71) Applicant: HAMAMATSU PHOTONICS K.K., Hamamatsu (JP)

(72) Inventors: Koji Takahashi, Hamamatsu (JP); Ryu Niigaki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/768,507

(22) PCT Filed: Nov. 19, 2020

(86) PCT No.: PCT/JP2020/043239
§ 371 (c)(1),
(2) Date: Apr. 13, 2022

(87) PCT Pub. No.: WO2021/131442
PCT Pub. Date: Jul. 1, 2021

(65) Prior Publication Data
US 2024/0094087 A1 Mar. 21, 2024

(30) Foreign Application Priority Data
Dec. 27, 2019 (JP) ................. 2019-239541

(51) Int. Cl.
G01M 11/00 (2006.01)
(52) U.S. Cl.
CPC .................. G01M 11/33 (2013.01)
(58) Field of Classification Search
CPC .................. G01M 11/33
See application file for complete search history.

(56) References Cited

FOREIGN PATENT DOCUMENTS

| JP | 2003-139655 A | 5/2003 |
|---|---|---|
| JP | 2003-166904 A | 6/2003 |

(Continued)

OTHER PUBLICATIONS

Stolen, R. H. and Lin, Chinlon, Self-phase-modulation in silica optical fibers,, Physical Review A, 1978, vol. 17, No. 4, pp. 1448-1453.

(Continued)

*Primary Examiner* — Tri T Ton
(74) *Attorney, Agent, or Firm* — Faegre Drinker Biddle & Reath LLP

(57) ABSTRACT

In a measurement method, light inputs with the same center wavelength and different properties are performed on a light transmission medium, and a measured value of an intensity spectrum of each of light outputs is acquired. An error between the measured value and an estimated value of the intensity spectrum calculated based on a theoretical relation between an intensity spectrum and a phase spectrum of each of the light inputs, a nonlinear coefficient and a wavelength dispersion value of the light transmission medium, and the intensity spectrum of each of the light outputs is calculated while changing the nonlinear coefficient and the wavelength dispersion value. Further, the nonlinear coefficient and the wavelength dispersion value are determined based on a difference, in a relation between the nonlinear coefficient and the wavelength dispersion value and the error, between the light inputs.

16 Claims, 9 Drawing Sheets

(56) References Cited

FOREIGN PATENT DOCUMENTS

| WO | WO-2014112020 A1 | * | 7/2014 | ........ | G01M 11/3145 |
| WO | WO-2017/223149 A1 | | 12/2017 | | |

OTHER PUBLICATIONS

Vengelis, Julius et al., "Estimation of photonic crystal fiber dispersion by means of supercontinuum generation," Optics Letters, 2017, vol. 42, No. 9, pp. 1844-1847.
International Preliminary Report on Patentability mailed Jul. 7, 2022 for PCT/JP2020/043239.

* cited by examiner

*Fig.4*
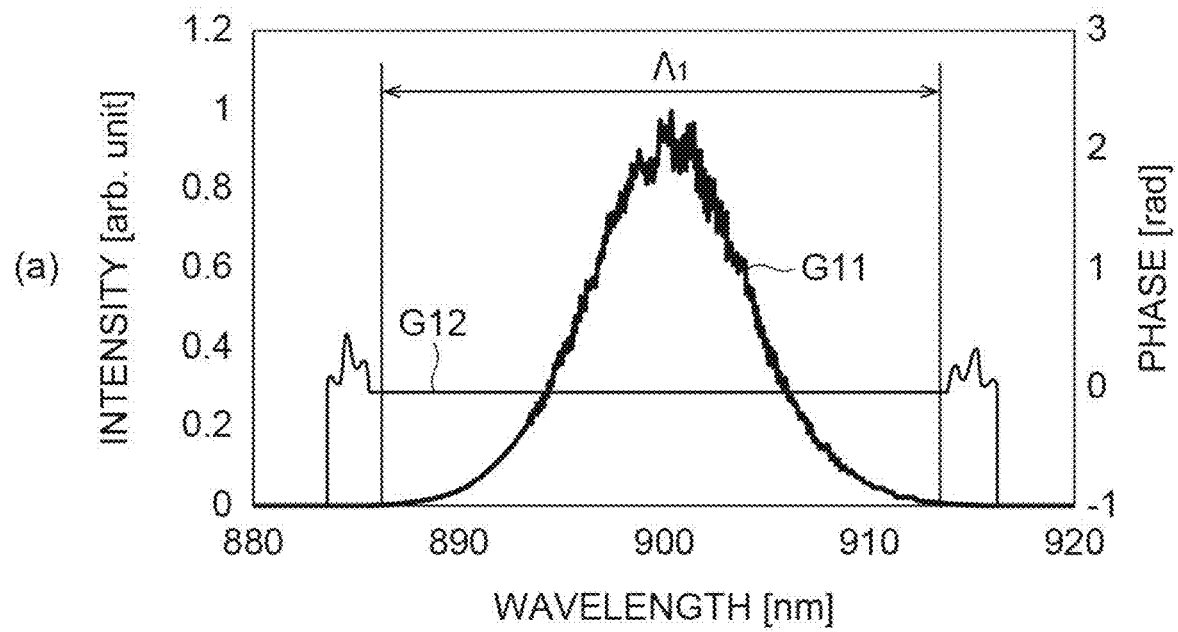
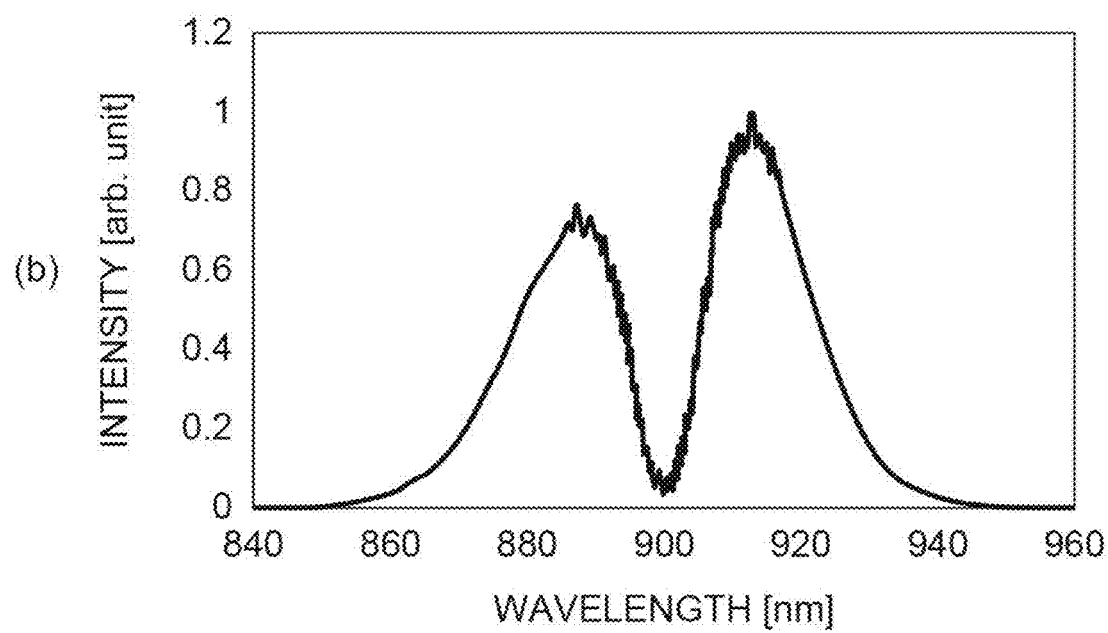

Fig.6
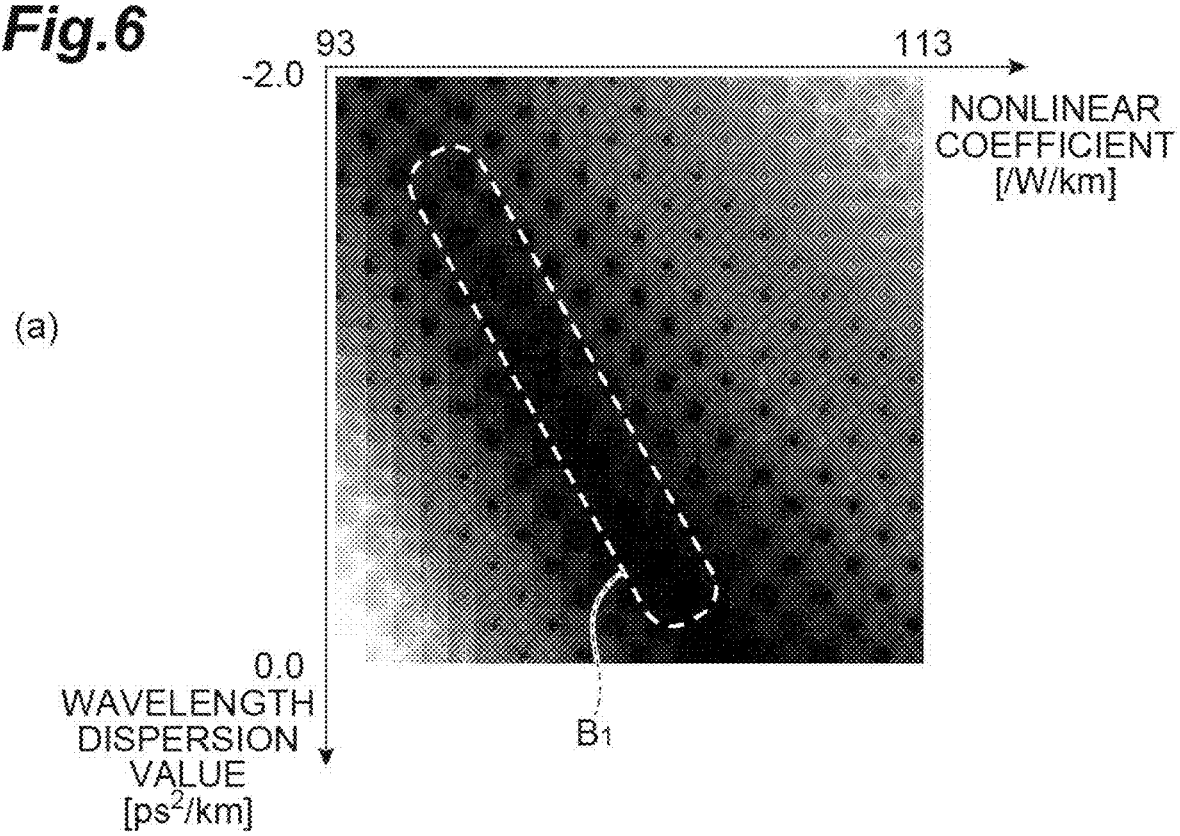
(a)
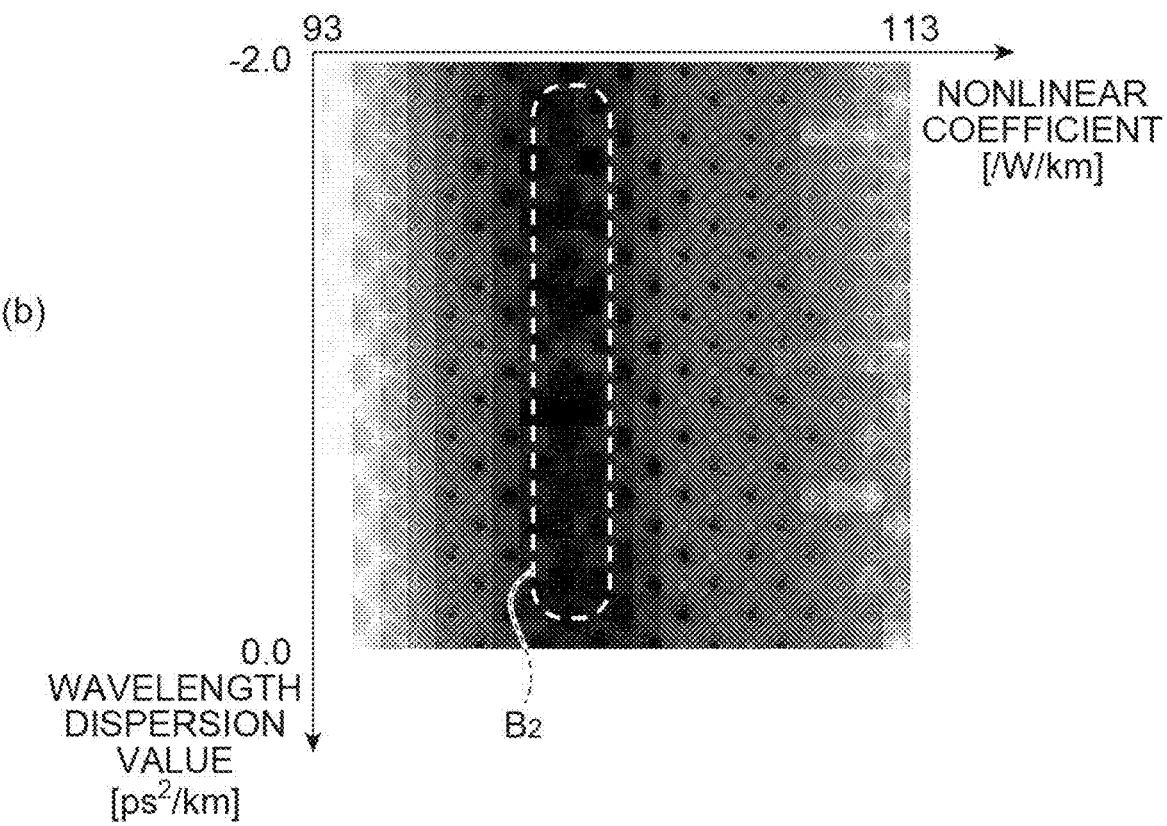
(b)

*Fig.8*
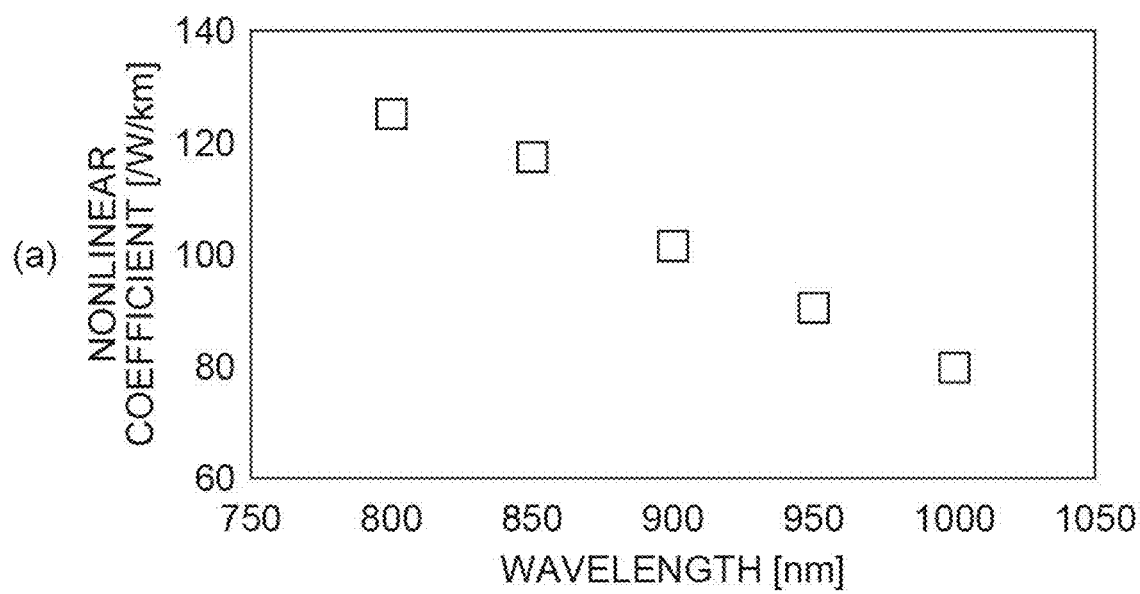
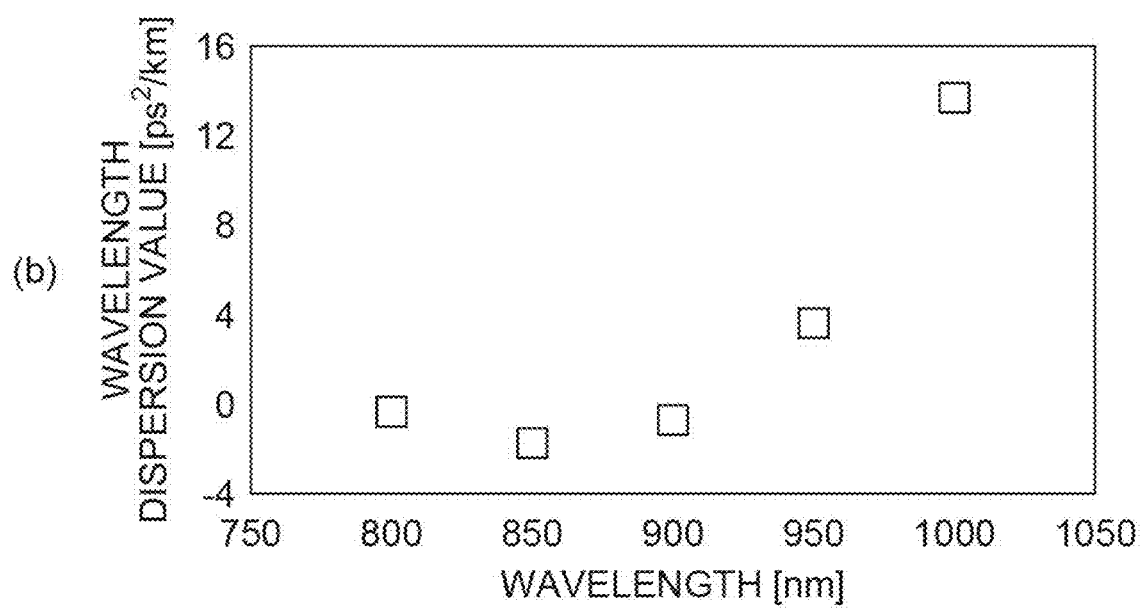

METHOD FOR MEASURING LIGHT TRANSMISSION MEDIUM, DEVICE FOR MEASURING LIGHT TRANSMISSION MEDIUM, PROGRAM FOR MEASURING LIGHT TRANSMISSION MEDIUM, AND RECORDING MEDIUM

TECHNICAL FIELD

The present disclosure relates to a light transmission medium measurement method, a light transmission medium measurement apparatus, a light transmission medium measurement program, and a recording medium.

BACKGROUND ART

Patent Document 1 discloses a technique related to a method of estimating a distribution of an optical physical constant in a light transmission medium. The method includes an acquisition step of acquiring a power spectrum and a phase spectrum of a plurality of input light signals with different intensities, a measurement step of measuring a power spectrum of an output light signal output after propagation of the input light signal in the light transmission medium for each intensity of the input light signal, and an estimation step of estimating the optical physical constant of each light transmission medium based on a propagation simulation result by a model in which each input light signal propagates through the light transmission medium.

In the above method, in the estimation step, the optical physical constant of each light transmission medium is estimated by searching for the optical physical constant using an evaluation function of evaluating a difference between the measured power spectrum of the output light signal and the power spectrum of the output light signal obtained as a result of the propagation simulation.

Non Patent Document 1 describes a method of measuring a nonlinear optical constant of an optical fiber by using a nonlinear spectral change generated in the optical fiber. Further, Non Patent Document 2 describes a method of measuring a wavelength dispersion value of an optical fiber by using a nonlinear spectral change generated in the optical fiber.

CITATION LIST

Patent Literature

Patent Document 1: International Publication No. 2014/112020

Non Patent Literature

Non Patent Document 1: R. H. Stolen and Chinlon Lin, "Self-phase-modulation in silica optical fibers", Physical Review A, Vol. 17 No. 4, pp. 1448-1453, 1978

Non Patent Document 2: Julius Vengelis, Vygandas Jarutis, and Valdas Sirutkaitis, "Estimation of photonic crystal fiber dispersion by means of supercontinuum generation", Optics Letters, Vol. 42 No. 9, pp. 1844-1847, 2017

SUMMARY OF INVENTION

Technical Problem

When constituting an optical system using a light transmission medium, it may be desirable to accurately acquire a nonlinear coefficient and a wavelength dispersion value being parameters of the light transmission medium. For example, when a temporal waveform of a light pulse having an extremely short time width of several picoseconds (hereinafter, referred to as an ultrashort light pulse) is controlled and output, desired accuracy of the temporal waveform may not be obtained due to a control error and distortion of the temporal waveform of the light pulse output from the light pulse generation apparatus, and distortion of the temporal waveform of the light pulse caused by an optical system disposed in a subsequent stage of the light pulse generation apparatus, and the like.

In such a case, a configuration may be considered in which the temporal waveform of the light pulse is accurately measured, and feedback to the light pulse generation apparatus is performed for causing the temporal waveform to approach the desired temporal waveform. For accurately measuring the temporal waveform of the light pulse, it is important to accurately acquire the nonlinear coefficient and the wavelength dispersion value of the light transmission medium used in the measurement of the temporal waveform.

An object of an embodiment is to provide a light transmission medium measurement method, a light transmission medium measurement apparatus, a light transmission medium measurement program, and a recording medium capable of accurately acquiring a nonlinear coefficient and a wavelength dispersion value of a light transmission medium.

Solution to Problem

An embodiment is a light transmission medium measurement method. The light transmission medium measurement method is a method for measuring a nonlinear coefficient and a wavelength dispersion value of a light transmission medium, and includes a measured value acquisition step of performing a plurality of light inputs with the same center wavelength and different properties to the light transmission medium, and acquiring a measured value of an intensity spectrum of each of a plurality of light outputs from the light transmission medium respectively corresponding to the plurality of light inputs; an error calculation step of calculating an error between the measured value and an estimated value of the intensity spectrum calculated based on a theoretical relation between an intensity spectrum and a phase spectrum of each of the plurality of light inputs, the nonlinear coefficient and the wavelength dispersion value of the light transmission medium, and the intensity spectrum of each of the plurality of light outputs while changing the nonlinear coefficient and the wavelength dispersion value; and a parameter determination step of determining the nonlinear coefficient and the wavelength dispersion value of the light transmission medium based on a difference, in a relation between the nonlinear coefficient and the wavelength dispersion value and the error, between the plurality of light inputs caused by a difference in the property.

An embodiment is a light transmission medium measurement apparatus. The light transmission medium measurement apparatus is an apparatus for measuring a nonlinear coefficient and a wavelength dispersion value of a light transmission medium, and includes a light source unit for performing a plurality of light inputs with the same center wavelength and different properties to the light transmission medium; a spectrum acquisition unit for acquiring a measured value of an intensity spectrum of each of a plurality of light outputs from the light transmission medium respectively corresponding to the plurality of light inputs; and an operation unit for calculating an error between the measured value and an estimated value of the intensity spectrum calculated based on a theoretical relation between an intensity spectrum and a phase spectrum of each of the plurality of light inputs, the nonlinear coefficient and the wavelength dispersion value of the light transmission medium, and the intensity spectrum of each of the plurality of light outputs while changing the nonlinear coefficient and the wavelength dispersion value, and determining the nonlinear coefficient and the wavelength dispersion value of the light transmission medium based on a difference, in a relation between the nonlinear coefficient and the wavelength dispersion value and the error, between the plurality of light inputs caused by a difference in the property.

An embodiment is a light transmission medium measurement program. The light transmission medium measurement program is a program for measuring a nonlinear coefficient and a wavelength dispersion value of a light transmission medium, and causes a computer to function as a calculation unit for calculating an error between an estimated value of an intensity spectrum calculated based on a theoretical relation between an intensity spectrum and a phase spectrum of each of a plurality of light inputs with the same center wavelength and different properties, the nonlinear coefficient and the wavelength dispersion value of the light transmission medium, and the intensity spectrum of each of a plurality of light outputs from the light transmission medium respectively corresponding to the plurality of light inputs, and a measured value of the intensity spectrum of each of the plurality of light outputs while changing the nonlinear coefficient and the wavelength dispersion value; and a determination unit for determining the nonlinear coefficient and the wavelength dispersion value of the light transmission medium based on a difference, in a relation between the nonlinear coefficient and the wavelength dispersion value and the error, between the plurality of light inputs caused by a difference in the property.

An embodiment is a recording medium. The recording medium is a computer readable medium recording the above light transmission medium measurement program.

The nonlinear coefficient and the wavelength dispersion value of the light transmission medium can be, theoretically, obtained by measuring the intensity spectrum of the light output obtained by inputting light to the light transmission medium, estimating the intensity spectrum of the output light from the theoretical relation with the property of the input light, and the nonlinear coefficient and the wavelength dispersion value of the light transmission medium, and searching for the nonlinear coefficient and the wavelength dispersion value with which the error of the estimated value with respect to the measured value is minimized.

However, according to the findings of the present inventors, it is actually difficult to uniquely determine the nonlinear coefficient and the wavelength dispersion value by the above method due to a measurement error, a rounding error of a computer, and the like. In addition, when the error of the estimated value with respect to the measured value is near the minimum value, there is a significant correlation between the nonlinear coefficient and the wavelength dispersion value. Further, the correlation changes according to the property (intensity spectrum, phase spectrum, and the like) of the light input.

Therefore, in the above measurement method, the measurement apparatus, and the measurement program, the plurality of light inputs with the same center wavelength and different properties are performed on the light transmission medium, and the error of the estimated value with respect to the obtained measured value of the intensity spectrum of the plurality of light outputs is calculated while changing the nonlinear coefficient and the wavelength dispersion value. Then, the nonlinear coefficient and the wavelength dispersion value of the light transmission medium are determined based on the difference between the plurality of light inputs in the relation between the nonlinear coefficient and the wavelength dispersion value and the error. According to the above measurement method, the measurement apparatus, and the measurement program, the nonlinear coefficient and the wavelength dispersion value of the light transmission medium can be accurately acquired.

Advantageous Effects of Invention

According to the embodiments, it is possible to provide a light transmission medium measurement method, a light transmission medium measurement apparatus, a light transmission medium measurement program, and a recording medium capable of accurately acquiring a nonlinear coefficient and a wavelength dispersion value of a light transmission medium.

BRIEF DESCRIPTION OF DRAWINGS

FIG. 4 includes (a) a graph showing an example of a test pulse, and (b) a graph showing a measured value of an intensity spectrum of a light output corresponding to a light input of the test pulse with a property shown in (a), and a graph G11 shows an intensity spectrum of the test pulse, and a graph G12 shows a phase spectrum of the test pulse.

FIG. 6 includes graphs showing examples of a relation between a nonlinear coefficient and a wavelength dispersion value, and an intensity spectrum estimation error for two test pulses, and shows (a) the relation between the nonlinear coefficient and the wavelength dispersion value and the intensity spectrum estimation error for the first generated test pulse, and (b) the relation between the nonlinear coefficient and the wavelength dispersion value and the intensity spectrum estimation error for the second generated test pulse.

FIG. 8 includes graphs showing (a) a wavelength dependency of the nonlinear coefficient and (b) a wavelength dependency of the wavelength dispersion value in a certain light transmission medium 4.

DESCRIPTION OF EMBODIMENTS

Hereinafter, embodiments of a light transmission medium measurement method, a light transmission medium measurement apparatus, a light transmission medium measurement program, and a recording medium will be described in detail with reference to the accompanying drawings. In the description of the drawings, the same elements will be denoted by the same reference signs, and redundant description will be omitted. The present invention is not limited to these examples.

Figure 1:
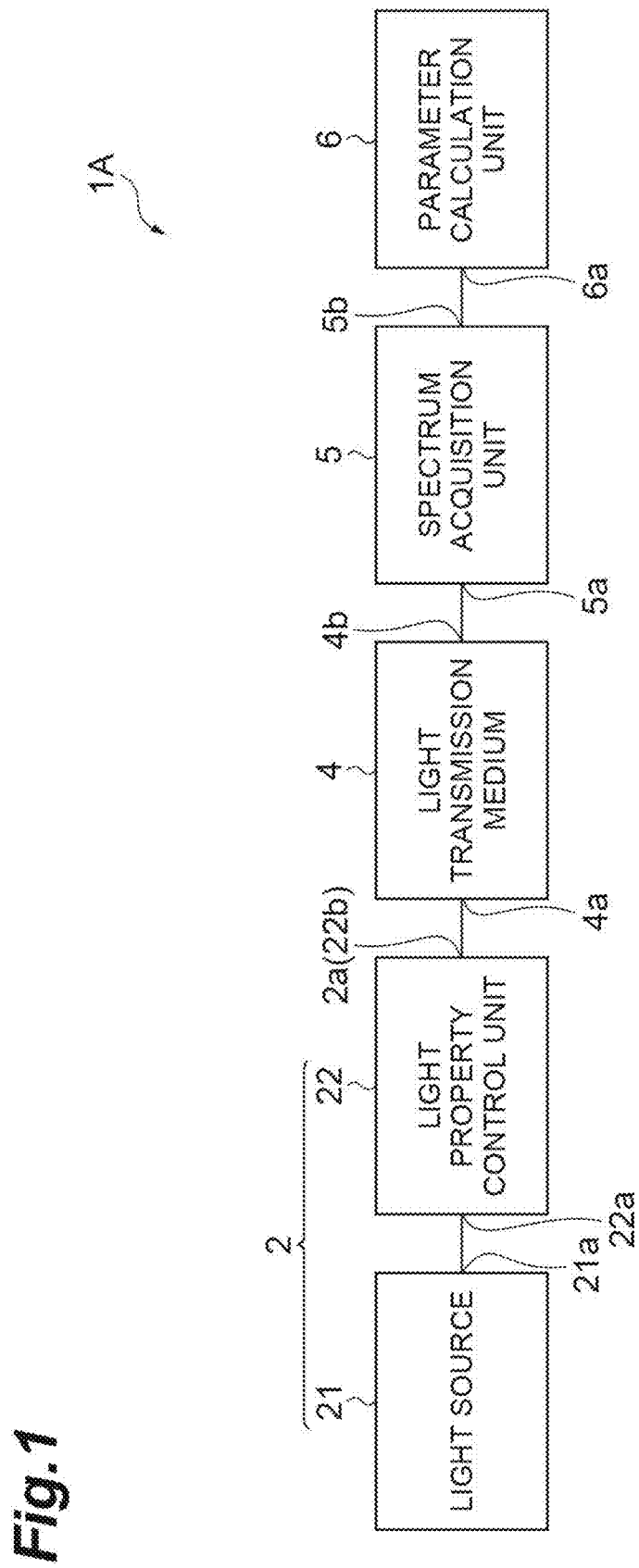
FIG. 1 is a block diagram schematically illustrating a configuration of a light transmission medium measurement apparatus 1A according to an embodiment.

FIG. 1 is a block diagram schematically illustrating a configuration of a light transmission medium measurement apparatus (hereinafter, simply referred to as a measurement apparatus) 1A according to an embodiment. The measurement apparatus 1A is an apparatus for measuring a nonlinear coefficient and a wavelength dispersion value of a light transmission medium 4 being a nonlinear inducing medium. As light propagates through the nonlinear inducing medium, a nonlinear spectral change is induced. The above spectral change is a change depending on parameters of the nonlinear inducing medium, in particular, the nonlinear coefficient and the wavelength dispersion value.

Therefore, the measurement apparatus 1A sets assumed values of the nonlinear coefficient and the wavelength dispersion value, estimates an intensity spectrum after the change by a calculation based on a theory, and calculates an error between an estimated value and a measured value of the intensity spectrum after the change. The measurement apparatus 1A repeatedly performs the above calculation while changing the assumed values of the nonlinear coefficient and the wavelength dispersion value. Further, the property (intensity spectrum, phase spectrum, and the like) of the light is changed, and the above calculation is again performed. The measurement apparatus 1A determines the nonlinear coefficient and the wavelength dispersion value based on an obtained relation between the error between the estimated value and the measured value of the intensity spectrum, and the nonlinear coefficient and the wavelength dispersion value.

The light transmission medium 4 being a measurement object includes a medium which induces the nonlinear spectral change, and constitutes, for example, an optical waveguide. In one example, the light transmission medium 4 is a highly nonlinear optical fiber, or a thin wire waveguide formed on a substrate such as a silicon substrate. The thin wire waveguide is, for example, a channel waveguide, a slab waveguide, or a rib waveguide. The constituent material of the light transmission medium 4 is, for example, $SiO_2$, $Si$, $Si_3N_4$, or the like.

The light transmission medium 4 is used for, for example, measuring a temporal waveform of an ultrashort light pulse having a time width of several femtoseconds to several hundred femtoseconds. Specifically, a pulse light source being the measurement object is coupled to one end of the light transmission medium 4 in which the parameters such as the nonlinear coefficient and the wavelength dispersion value are known through a light intensity adjuster, and a spectrometer is coupled to the other end of the light transmission medium 4. Then, the light pulse is input to the light transmission medium 4 while changing the light intensity, and the intensity spectrum of the light pulse output from the light transmission medium 4 is measured.

The shape of the intensity spectrum changes depending on the temporal waveform, and thus, the temporal waveform of the light pulse can be known by an analysis using an optical fiber propagation simulation. The measurement apparatus 1A of the present embodiment accurately obtains the nonlinear coefficient and the wavelength dispersion value of the light transmission medium 4, for example, as preparation for the above measurement.

As illustrated in FIG. 1, the measurement apparatus 1A of the present embodiment includes a light source unit 2, a spectrum acquisition unit 5, and a parameter calculation unit 6. An output end 2a of the light source unit 2 is optically coupled to one end 4a of the light transmission medium 4. The light source unit 2 performs a plurality of light inputs to the light transmission medium 4. The light used for the light input is, for example, a light pulse having a time width of 10 femtoseconds or more and 100 picoseconds or less.

The light source unit 2 makes center wavelengths of the plurality of light inputs the same as each other, and makes properties of the plurality of light inputs different from each other. In addition, the property of the light input is, for example, at least one selected from an intensity spectrum, a phase spectrum, and a light pulse energy. The light pulse energy is a value obtained by time-integrating the intensity (power) of one light pulse from the rising edge to the falling edge of the light pulse.

The light source unit 2 of the present embodiment includes a light source 21 and a light property control unit 22. The light source 21 outputs light (for example, light pulse) having the same center wavelength and a predetermined property, a plurality of times. The light source 21 is, for example, an ultrashort pulse laser light source such as a femtosecond laser light source. An input end 22a of the light property control unit 22 is optically coupled to an output end 21a of the light source 21, and an output end 22b of the light property control unit 22 is optically coupled to the one end 4a of the light transmission medium 4.

The light property control unit 22 changes the property of the light output from the light source 21 each time, and inputs the light after the change from the output end 22b to the one end 4a of the light transmission medium 4. The light property control unit 22 changes, for example, at least one selected from the intensity spectrum, the phase spectrum, and the pulse energy of the light output from the light source 21 to an arbitrary value (or shape).

The light property control unit 22 may include, for example, a pulse shaper, a wavelength filter, an optical fiber, a neutral density (ND) filter, an optical system including a wave plate and a polarizer, an acousto-optic element (AO modulator), an acousto-optic tunable filter (AOTF), an iris (diaphragm), or a cutter. Further, the light property control unit 22 may be constituted by combining at least two of them.

An input end 5a of the spectrum acquisition unit 5 is optically coupled to the other end 4b of the light transmission medium 4. The spectrum acquisition unit 5 receives, at the input end 5a, the light output from the other end 4b of the light transmission medium 4 in response to the plurality of light inputs to the light transmission medium 4. Further, the spectrum acquisition unit 5 acquires a measured value of the intensity spectrum of each of the plurality of light outputs from the light transmission medium 4 respectively corresponding to the plurality of light inputs.

The spectrum acquisition unit 5 includes, for example, a spectroscope for dispersing the output light from the light transmission medium 4 and a photodetector for detecting the intensity of the output light after the dispersion for each wavelength. Further, the spectrum acquisition unit 5 may be an optical spectrum analyzer or a spectrophotometer of a Fourier transform type. A signal output end 5b of the spectrum acquisition unit 5 is electrically coupled to a signal input end 6a of the parameter calculation unit 6. The spectrum acquisition unit 5 outputs data of the obtained measured value of the intensity spectrum from the signal output end 5b to the parameter calculation unit 6.

The parameter calculation unit 6 receives, from the spectrum acquisition unit 5, the data of the measured value of the intensity spectrum of each of the plurality of light outputs. The parameter calculation unit 6 is an example of an operation unit in the present embodiment. The parameter calculation unit 6 determines the nonlinear coefficient and the wavelength dispersion value of the light transmission medium 4 based on the measured values of the intensity spectra of the plurality of light outputs.

In one example, the parameter calculation unit 6 is configured by a computer including a central processing unit (CPU) and a memory, or a programmable integrated circuit such as a field programmable gate array (FPGA). In the computer or the FPGA, a light transmission medium measurement program (hereinafter, simply referred to as a measurement program) for realizing processing of the parameter calculation unit 6 described later is written and stored.

The measurement program may be stored in the computer or the FPGA at the time of shipment of the measurement apparatus 1A, may be acquired via a communication line after shipment and then stored in the computer or the FPGA, or may be recorded in a computer readable recording medium and then stored in the computer or the FPGA. The recording medium may be an arbitrary medium such as a flexible disk, a CD-ROM, a DVD-ROM, a BD-ROM, a USB memory, or the like.

Figure 2:
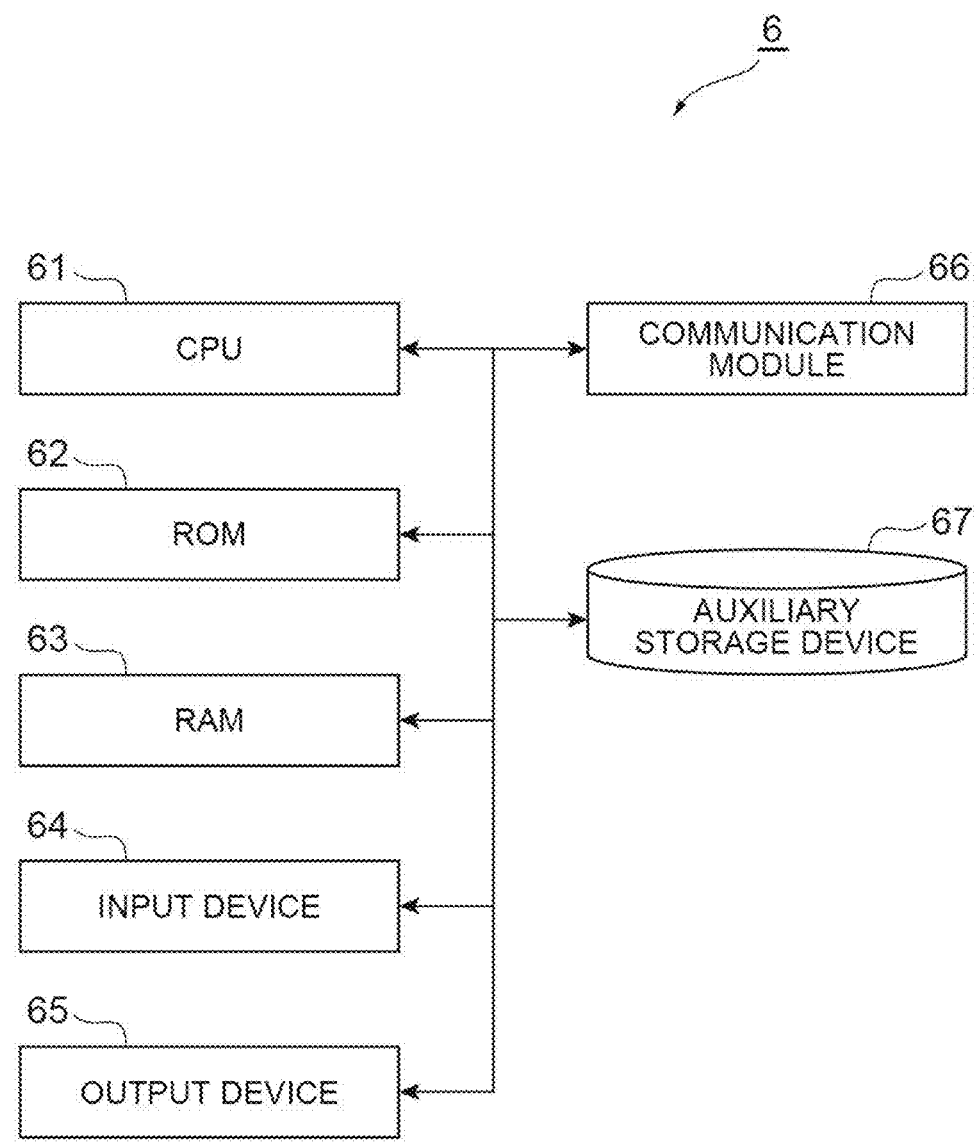
FIG. 2 is a diagram schematically illustrating a hardware configuration example in a case where a parameter calculation unit 6 is constituted by a computer.

FIG. 2 is a diagram schematically illustrating a hardware configuration example when the parameter calculation unit 6 is configured by the computer. As illustrated in FIG. 2, the parameter calculation unit 6 may be physically configured as a normal computer including a processor (CPU) 61, a main storage device such as a ROM 62 and a RAM 63, an input device 64 such as a keyboard, a mouse, and a touch screen, an output device 65 such as a display (including a touch screen), a communication module 66 such as a network card for transmitting and receiving data to and from other devices, an auxiliary storage device 67 such as a hard disk, and the like.

The processor 61 of the computer can implement the function of the parameter calculation unit 6 by the measurement program. In other words, the measurement program causes the processor 61 of the computer to operate as the parameter calculation unit 6. The measurement program is stored in a storage device (storage medium) inside or outside the computer, for example, the auxiliary storage device 67. The storage device may be a non-transitory recording medium. Examples of the recording medium include a recording medium such as a flexible disk, a CD, and a DVD, a recording medium such as a ROM, a semiconductor memory, a cloud server, and the like.

In addition, a light transmission medium measurement method (hereinafter, simply referred to as a measurement method) according to the present embodiment will be described, and the processing content of the parameter calculation unit 6 (measurement program), that is, the determination of the nonlinear coefficient and the wavelength dispersion value will be described in detail therein.

Figure 3:
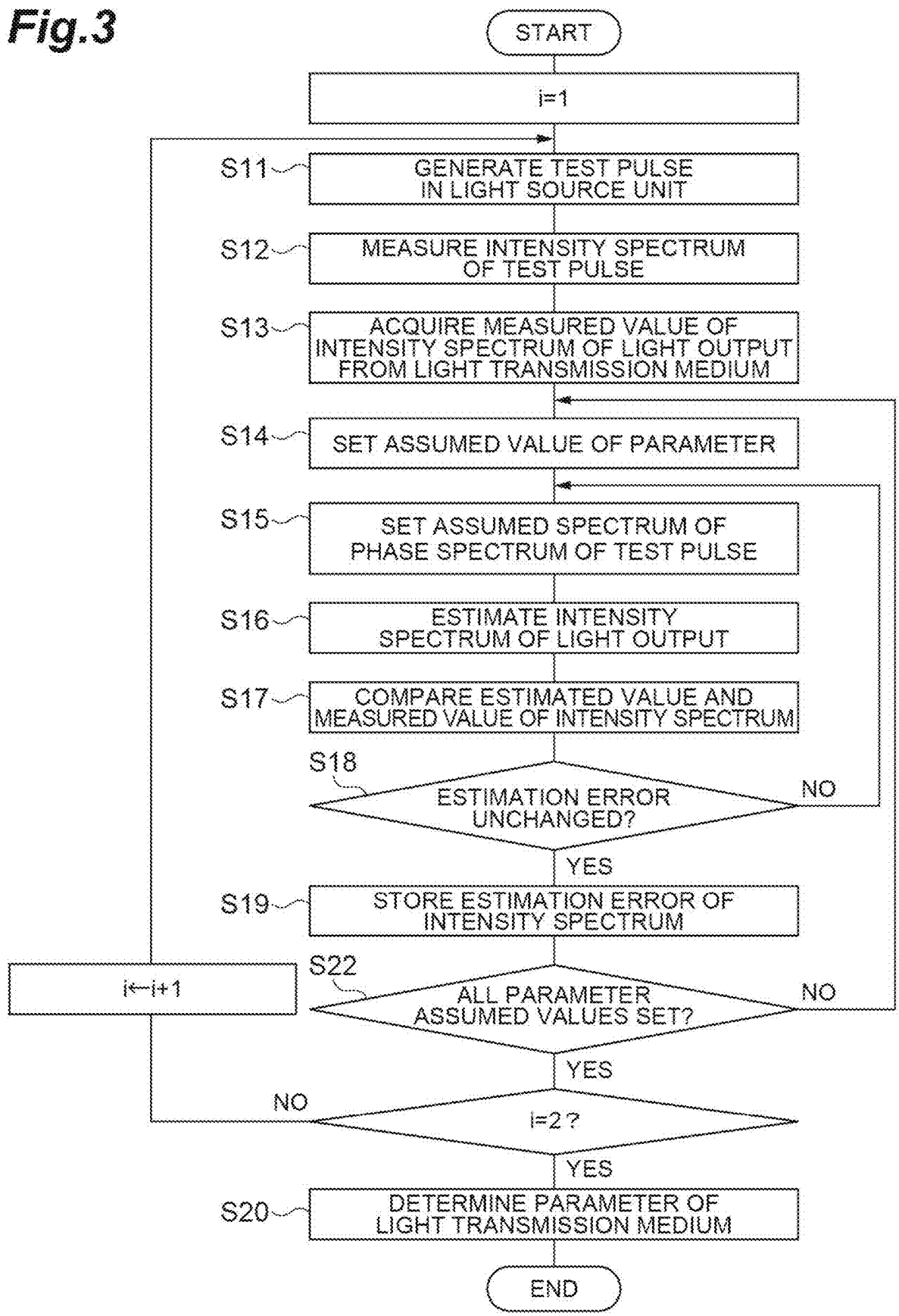
FIG. 3 is a flowchart illustrating a measurement method according to an embodiment.

FIG. 3 is a flowchart illustrating the measurement method of the present embodiment. In addition, the measurement method is a method in a case where the calculation is performed with the phase spectrum of the light output from the light source unit 2 in an unknown state. Further, in the measurement method, the nonlinear coefficient and the wavelength dispersion value are obtained by performing two light inputs to the light transmission medium 4.

As illustrated in FIG. 3, first, as a step S11, light (test pulse) is generated in the light source unit 2. Specifically, a light pulse is output from the light source 21, and the light property control unit 22 controls a property (for example, one or both of a phase spectrum and an intensity spectrum) of the light pulse to generate the test pulse in the light property control unit 22.

(a) in FIG. 4 is a graph showing an example of the test pulse, and a graph G11 in the figure indicates the intensity spectrum of the test pulse, and a graph G12 indicates the phase spectrum of the test pulse. As shown in (a) in FIG. 4, the intensity spectrum of the test pulse has a symmetric shape with respect to the center wavelength (900 nm in this example), and has a single-peaked shape in which the center wavelength is a peak of the intensity. Further, the phase spectrum of the test pulse has a flat shape in which the phase is substantially constant within a wavelength range $\Lambda_1$ of the intensity spectrum. Such a light pulse is generally called a Fourier transform limited (TL) pulse.

In addition, the flat shape in this case means that a variation amount of the phase is, for example, within a range of ±0.02 rad. Further, the wavelength range of the intensity spectrum refers to, for example, a range in which a value of the intensity is 1% or more of the peak intensity. In this example, a width of the wavelength range $\Lambda_1$ of the intensity spectrum is, for example, 25 nm. In the outside of the wavelength range $\Lambda_1$ of the intensity spectrum, the phase value may have an arbitrary value because it is a fictive value for the calculation purpose, and makes little contribution to the property of the test pulse.

Next, as a step S12, the intensity spectrum of the generated test pulse is measured. Specifically, the test pulse output from the light source unit 2 is input to the spectrum acquisition unit 5 without interposition of the light transmission medium 4, and the measured value of the intensity spectrum of the test pulse is acquired in the spectrum acquisition unit 5. The data of the measured value of the intensity spectrum is provided to the parameter calculation unit 6 as the intensity spectrum data on the light input.

Subsequently, as a step S13, the light input by the test pulse is performed to the light transmission medium 4, and the measured value of the intensity spectrum of the light output from the light transmission medium 4 corresponding to the light input is acquired (measured value acquisition step).

(b) in FIG. 4 is a graph showing the measured value of the intensity spectrum of the light output corresponding to the light input of the test pulse with the property shown in (a) in FIG. 4. Specifically, the test pulse output from the light source unit 2 is input to the one end 4a of the light transmission medium 4, and the spectrum acquisition unit 5 acquires the measured value of the intensity spectrum of the test pulse output from the other end 4b of the light transmission medium 4 after the propagation through the light transmission medium 4. The measured value is provided to the parameter calculation unit 6 as the measured value data of the intensity spectrum on the light output.

In addition, in the step S13, the test pulse may be input to the light transmission medium 4 a plurality of times while changing the light intensity of the test pulse, and the measured value of the intensity spectrum may be acquired for each input.

Subsequently, the parameter calculation unit 6 (measurement program) calculates an estimated value of the intensity spectrum based on a theoretical relation between the intensity spectrum and the phase spectrum of the light input, the nonlinear coefficient and the wavelength dispersion value of the light transmission medium 4, and the intensity spectrum of the light output. In this case, a plurality of estimated values are calculated while individually changing the nonlinear coefficient and the wavelength dispersion value. Further, an error (hereinafter, referred to as an intensity spectrum estimation error) between the plurality of estimated values and the measured value is calculated (error calculation step, calculation unit in the measurement program).

Specifically, as a step S14, the parameter calculation unit 6 sets assumed values of the parameters (nonlinear coefficient and wavelength dispersion value) of the light transmission medium 4. In addition, as a step S15, the parameter calculation unit 6 sets an assumed spectrum related to the phase spectrum of the test pulse output from the light source unit 2 (before being input to the light transmission medium 4).

Further, as a step S16, the parameter calculation unit 6 estimates the intensity spectrum related to the light output from the theoretical relation based on the assumed values of the nonlinear coefficient and the wavelength dispersion value and the assumed spectrum related to the phase spectrum. The theoretical relation is, for example, a relation represented by the following Formula.

$$\frac{\partial A}{\partial z} + \frac{\alpha(\omega_0)}{2}A - i\sum_{n=1}^{\infty}\frac{i^n \beta_n}{n!}\frac{\partial^n A}{\partial t^n} = $$

$$i\left(\gamma(\omega_0) + i\frac{\gamma(\omega_0)}{\omega_0}\right)\left(A(z,t)\int_0^\infty R(t')|A(z,t-t')|^2 dt'\right)$$

[Formula 1]

Here, A is an amplitude of an electric field, z is a propagation distance, $\beta_n$ is an nth-order dispersion, $\alpha$ is a loss coefficient, $\gamma$ is a nonlinear coefficient, $\omega_0$ is each frequency, and t is a time. A Fourier transform of A corresponds to the phase spectrum and the intensity spectrum. A can be estimated from the above formula, and thus, the intensity spectrum obtained by the Fourier transform can also be estimated.

Then, as a step S17, the parameter calculation unit 6 compares the estimated value of the intensity spectrum related to the light output and the measured value of the intensity spectrum related to the light output. The parameter calculation unit 6 performs the above steps S15 to S17 while changing the assumed spectrum until the intensity spectrum estimation error does not change (converges) (step S18: NO), and sets the assumed spectrum when the intensity spectrum estimation error does not change (becomes minimum) as the phase spectrum of the light input (step S18: YES).

Further, the parameter calculation unit 6 sets the estimated value of the intensity spectrum at this time as the estimated value of the intensity spectrum corresponding to the nonlinear coefficient and the wavelength dispersion value set in the step S14, and stores the intensity spectrum estimation error at this time as the intensity spectrum estimation error corresponding to the nonlinear coefficient and the wavelength dispersion value set in the step S14 (step S19).

Then, the parameter calculation unit 6 returns to the step S14 again (step S22), changes the assumed values of the parameters (nonlinear coefficient and wavelength dispersion value) of the light transmission medium 4, and then repeats the above steps S15 to S19. In this way, the parameter calculation unit 6 calculates the estimated value of the intensity spectrum and the intensity spectrum estimation error corresponding to each assumed value while changing the assumed values of the parameters (nonlinear coefficient and wavelength dispersion value) of the light transmission medium 4.

Then, the process returns to the step S11 again, and the light source unit 2 again generates the test pulse. The test pulse is a light pulse whose center wavelength is the same as that of the previously generated test pulse and whose intensity spectrum is different.

Figure 5:
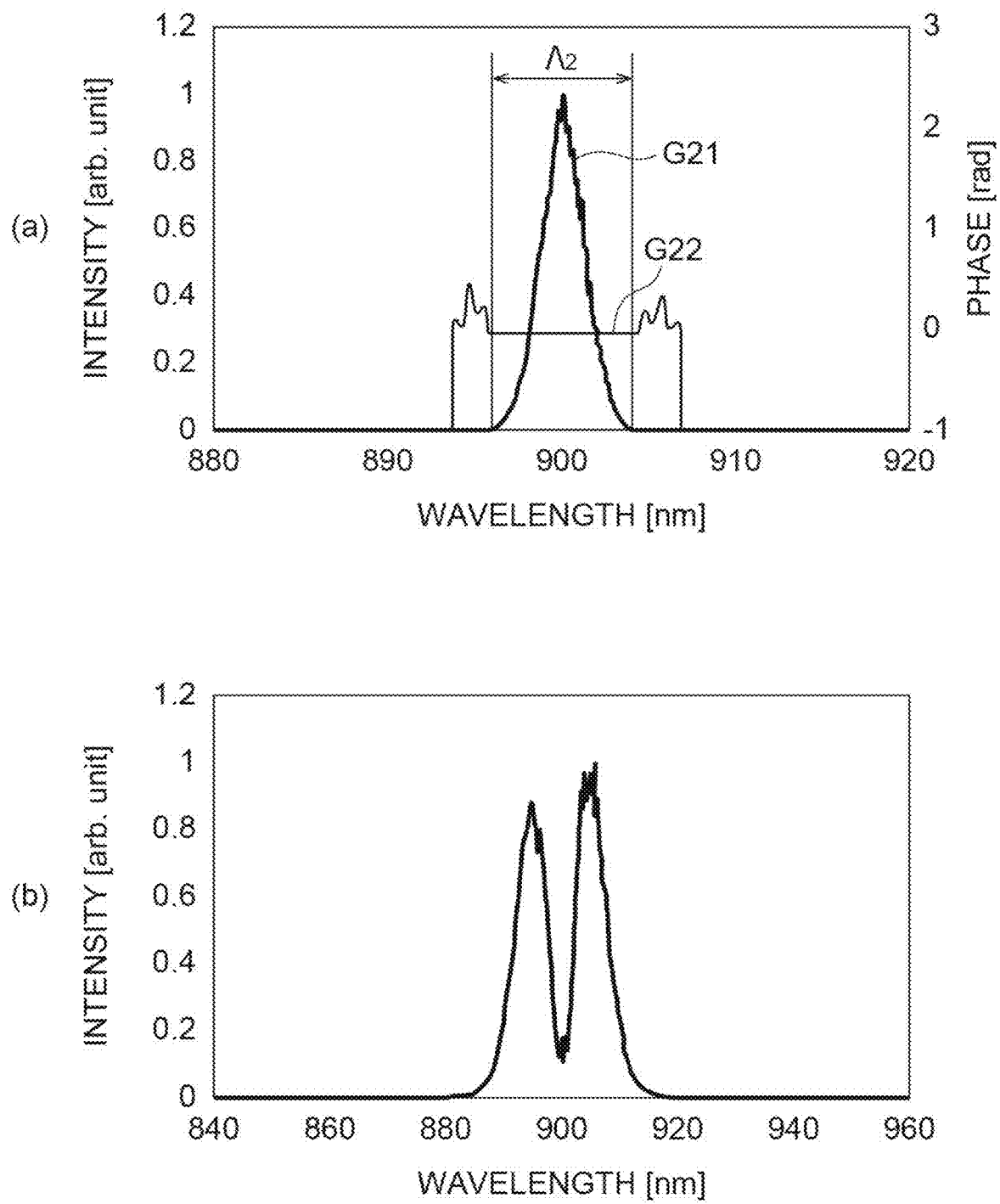
FIG. 5 includes (a) a graph showing an example of the test pulse, and (b) a graph showing a measured value of an intensity spectrum of a light output corresponding to a light input of the test pulse with a property shown in (a), and a graph G21 shows an intensity spectrum of the test pulse, and a graph G22 shows a phase spectrum of the test pulse.

(a) in FIG. 5 is a graph showing an example of the test pulse, and a graph G21 in the figure indicates the intensity spectrum of the test pulse, and a graph G22 indicates the phase spectrum of the test pulse. As shown in (a) in FIG. 5, the intensity spectrum of the test pulse has a symmetric shape with respect to the center wavelength (900 nm in this example), and has a single-peaked shape in which the center wavelength is a peak of the intensity, similarly to the previous test pulse (see (a) in FIG. 4).

In addition, a width of a wavelength range $\Lambda_2$ of the intensity spectrum, that is, the intensity spectrum width is smaller than that of the previous test pulse ((a) in FIG. 4). In this example, the width of the wavelength range $\Lambda_2$ is, for example, 7 nm. Further, the phase spectrum of the test pulse has a flat shape in which the phase is substantially constant within the wavelength range of the intensity spectrum.

After generating the above test pulse, the above steps S12 to S19 are repeated again. (b) in FIG. 5 is a graph showing the measured value of the intensity spectrum of the light output corresponding to the light input of the test pulse with the property shown in (a) in FIG. 5. Through the above processing, it is possible to acquire the relation between the nonlinear coefficient, the wavelength dispersion value, and the intensity spectrum estimation error for the two test pulses having the same center wavelength and different properties.

FIG. 6 includes graphs showing examples of the relation between the nonlinear coefficient and the wavelength dispersion value and the intensity spectrum estimation error for the two test pulses. (a) in FIG. 6 shows the relation between the nonlinear coefficient and the wavelength dispersion value and the intensity spectrum estimation error for the first generated test pulse. (b) in FIG. 6 shows the relation between the nonlinear coefficient and the wavelength dispersion value and the intensity spectrum estimation error for the second generated test pulse.

In these graphs, the vertical axis represents the wavelength dispersion value (unit: $ps^2/km$), the horizontal axis represents the nonlinear coefficient (unit: /W/km), and the magnitude of the intensity spectrum estimation error is represented by light and shade. The darker the color of a region, the smaller the intensity spectrum estimation error. Regions $B_1$ and $B_2$ surrounded by dashed lines in the figure represent regions in which the error is close to a minimum value (in other words, regions in which the intensity spectrum estimation error is smaller than a certain threshold value).

In view of the existence ranges of the regions $B_1$ and $B_2$, it can be seen that a combination of the nonlinear coefficient and the wavelength dispersion value causing the intensity spectrum estimation error to approach the minimum value has a linear relation. Further, when these figures are compared, when the properties (in this example, intensity spectrum widths) of the two test pulses are different from each other, there is a difference in the relation between the nonlinear coefficient and the wavelength dispersion value and the intensity spectrum estimation error (specifically, proportionality coefficient in the linear relation, or the like). In other words, the difference in the relation between the nonlinear coefficient and the wavelength dispersion value and the intensity spectrum estimation error is caused by the difference in the property in the first and second light inputs.

Figure 7:
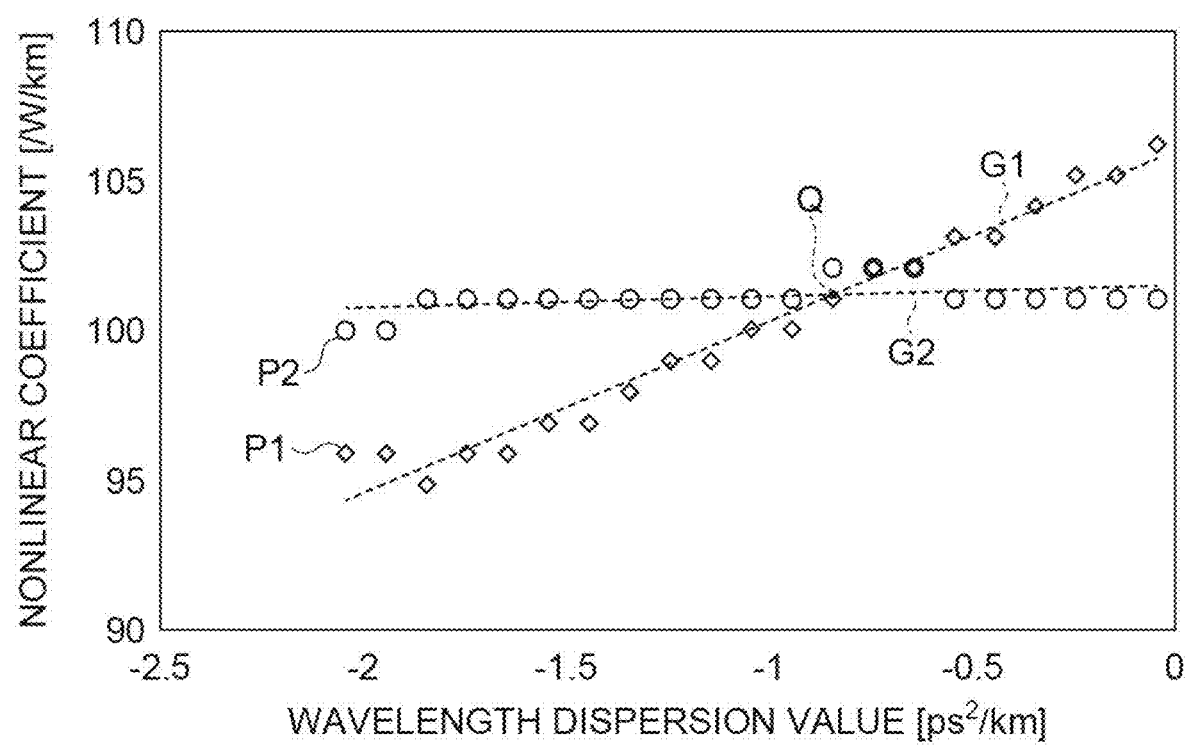
FIG. 7 is a graph in which a value of the nonlinear coefficient with which the intensity spectrum estimation error is minimized is extracted for each wavelength dispersion value, and plotted with the wavelength dispersion value as the horizontal axis and the nonlinear coefficient as the vertical axis.

FIG. 7 is a graph in which the value of the nonlinear coefficient with which the intensity spectrum estimation error is minimized is extracted for each wavelength dispersion value, and plotted with the wavelength dispersion value as the horizontal axis and the nonlinear coefficient as the vertical axis. In FIG. 7, rhombic plots P1 correspond to (a) in FIG. 6, and circular plots P2 correspond to (b) in FIG. 6.

Further, a straight line G1 is an approximate straight line based on the plurality of plots P1, and a straight line G2 is an approximate straight line based on the plurality of plots P2. That is, the straight line G1 represents the linear relation between the nonlinear coefficient and the wavelength dispersion value causing the intensity spectrum estimation error to approach the minimum value, corresponding to the first light input. Further, the straight line G2 represents the linear relation between the nonlinear coefficient and the wavelength dispersion value causing the error to approach the minimum value, corresponding to the second light input.

The parameter calculation unit 6 (measurement program) determines, in a step S20 of FIG. 3, the nonlinear coefficient and the wavelength dispersion value of the light transmission medium 4 based on the difference, in the relation between the nonlinear coefficient and the wavelength dispersion value and the intensity spectrum estimation error, between the first and second light inputs (parameter determination step, determination unit in the measurement program). Specifically, the nonlinear coefficient and the wavelength dispersion value of the light transmission medium 4 are determined from an intersection point Q of the two approximate straight lines G1 and G2.

In this example, when the nonlinear coefficient is x and the wavelength dispersion value is y, the approximate straight line G1 is expressed as y=5.7072x+106.04, and the approximate straight line G2 is expressed as y=0.3751x+104.54. Thus, the intersection point of these is calculated as (x, y)=(101.2, −0.84), and the nonlinear coefficient and the wavelength dispersion value are respectively determined as 101.2 [/W/km] and −0.84 [ps²/km].

In addition, in the above example, the nonlinear coefficient and the wavelength dispersion value are determined by the two light inputs to the light transmission medium 4, but the nonlinear coefficient and the wavelength dispersion value may be determined by three or more light inputs. In this case, unlike the case shown in FIG. 7, the intersection point of straight lines may not be uniquely obtained, but the optimal nonlinear coefficient and wavelength dispersion value may be determined based on a plurality of intersection points, for example, the average of the plurality of intersection points may be used as the nonlinear coefficient and the wavelength dispersion value.

Further, in the above example, the intensity spectrum is measured (step S12) and then the intensity spectrum is estimated (step S16), but the order of these may be reversed. That is, the intensity spectrum may be measured after the intensity spectrum is estimated.

Further, referring to (b) in FIG. 6 and the approximate straight line G2 in FIG. 7, the nonlinear coefficient is substantially constant in the combination of the nonlinear coefficient and the wavelength dispersion value causing the intensity spectrum estimation error to approach the minimum value. As described above, depending on the intensity spectrum width of the light input, the intensity spectrum estimation error becomes insensitive to the change of the wavelength dispersion value. From this, by obtaining the relation between the nonlinear coefficient and the wavelength dispersion value and the intensity spectrum estimation error while changing the intensity spectrum width of the light input, it is possible to know the intensity spectrum width at which the wavelength dispersion value becomes constant.

In addition, in the above example, the nonlinear coefficient is substantially constant when the intensity spectrum width is 7 nm, and further, the magnitude of the intensity spectrum width at which the nonlinear coefficient is substantially constant is considered to change according to various parameters of the light transmission medium 4.

By using the measurement method described above, the nonlinear coefficient and the wavelength dispersion value of the light transmission medium 4 at the predetermined wavelength (900 nm in the above example) can be measured. Further, by repeating the measurement while changing the predetermined wavelength (that is, while changing the center wavelength of the intensity spectra shown in (a) in FIG. 4 and (a) in FIG. 5), the wavelength dependency of the nonlinear coefficient and the wavelength dispersion value of the light transmission medium 4 can also be measured.

FIG. 8 includes graphs showing (a) the wavelength dependency of the nonlinear coefficient and (b) the wavelength dependency of the wavelength dispersion value in a certain light transmission medium 4. In FIG. 8, the horizontal axis of (a) and (b) represents the wavelength (unit: nm), the vertical axis of (a) represents the nonlinear coefficient (unit: /W/km), and the vertical axis of (b) represents the wavelength dispersion value (unit: ps²/km). In these graphs, the nonlinear coefficient and the wavelength dispersion value are measured while changing the predetermined wavelength to 800 nm, 850 nm, 900 nm, 950 nm, and 1000 nm. Thus, according to the present embodiment, it is possible to accurately measure the wavelength property of the nonlinear coefficient and the wavelength dispersion value.

Effects obtained by the measurement apparatus 1A, the measurement method, and the measurement program according to the present embodiment described above will be described.

In the conventional technique for example described in Patent Document 1, the nonlinear coefficient and the wavelength dispersion value of the light transmission medium 4 can be, theoretically, uniquely determined by measuring the intensity spectrum of the light output obtained by inputting light to the light transmission medium 4, estimating the intensity spectrum of the output light from the theoretical relation with the property of the input light, and the nonlinear coefficient and the wavelength dispersion value of the light transmission medium 4, and searching for the nonlinear coefficient and the wavelength dispersion value with which the error of the estimated value with respect to the measured value is minimized.

However, according to the findings of the present inventors, it is actually difficult to uniquely determine the nonlinear coefficient and the wavelength dispersion value by the above method due to a measurement error, a rounding error of a computer, and the like. In addition, as shown in FIG. 6, when the intensity spectrum estimation error is near the minimum value, there is a significant correlation between the nonlinear coefficient and the wavelength dispersion value. Further, the correlation changes according to the property (intensity spectrum, phase spectrum, light pulse energy, or the like) of the light input, as is apparent from the comparison between (a) and (b) in FIG. 6.

Therefore, in the present embodiment, the plurality of light inputs with the same center wavelength and different properties are performed on the light transmission medium 4, and the obtained intensity spectrum estimation error of the plurality of light outputs is calculated while changing the nonlinear coefficient and the wavelength dispersion value. Then, the nonlinear coefficient and the wavelength dispersion value of the light transmission medium 4 are determined based on the difference, in the relation between the nonlinear coefficient and the wavelength dispersion value and the intensity spectrum estimation error, between the plurality of light inputs caused by the difference in the property. Thus, the nonlinear coefficient and the wavelength dispersion value of the light transmission medium 4 can be accurately acquired.

As in the present embodiment, in the step S20, the combination of the nonlinear coefficient and the wavelength dispersion value causing the intensity spectrum estimation error to approach the minimum value may have the linear relation, and the parameter calculation unit 6 may determine the nonlinear coefficient and the wavelength dispersion value of the light transmission medium 4 based on the two linear relations respectively corresponding to the plurality of light inputs. In this case, the nonlinear coefficient and the wavelength dispersion value of the light transmission medium 4 can be easily obtained.

As in the steps S15 to S19 of the present embodiment, the relation between the intensity spectrum estimation error and the assumed spectrum may be obtained by changing the assumed spectrum of the phase spectrum input to the theoretical relation, and the estimated value may be calculated using the assumed spectrum with which the intensity spectrum estimation error is minimized as the phase spectrum of each light input. In this case, the measurement of the present embodiment can be performed using the light whose phase spectrum is unknown, and the measurement of the phase spectrum can be omitted, and thus, it is possible to reduce time required for the measurement of the nonlinear coefficient and the wavelength dispersion value.

As shown in (a) in FIG. 4 and (a) in FIG. 5, the intensity spectra of the plurality of light inputs may be different from each other. According to the research of the present inventors, in this case, the relation between the nonlinear coefficient and the wavelength dispersion value and the intensity spectrum estimation error greatly differs between the plurality of light inputs. Thus, the nonlinear coefficient and the wavelength dispersion value of the light transmission medium 4 can be determined more accurately. In particular, when the wavelength ranges (spectrum widths) of the intensity spectra of the plurality of light inputs are different from each other, the above tendency becomes more significant.

Further, in the above case, as shown in (a) in FIG. 4 and (a) in FIG. 5, the phase spectrum of each light input may be flat within the wavelength range of the intensity spectrum. According to the research of the present inventors, when the phase spectrum is flat, the change amount of the intensity spectrum estimation error with respect to the unit change of the nonlinear coefficient and the wavelength dispersion value is larger than that in the case where the phase spectrum is not flat. Thus, the relationship between the nonlinear coefficient and the wavelength dispersion value and the intensity spectrum estimation error becomes clearer, and thus, it is possible to more accurately determine the nonlinear coefficient and the wavelength dispersion value of the light transmission medium 4.

As in the present embodiment, in the step S13, the plurality of light inputs may be performed while changing the property of the light output from the common light source 21 by the light property control unit 22. In other words, the light source unit 2 may include the light source 21 for outputting the light having a predetermined property, and the light property control unit 22 for performing the plurality of light inputs while changing the property of the light output from the light source 21. In this case, the plurality of light inputs can be performed using the single light source 21, and thus, the configuration necessary for the measurement can be simplified.

In addition, instead of the above configuration, for example, a plurality of light sources with the same center wavelength and different properties may be prepared, and the light inputs may be sequentially performed from these light sources to the light transmission medium 4. In this case also, the nonlinear coefficient and the wavelength dispersion value of the light transmission medium 4 can be accurately acquired.

First Modification

Figure 9:
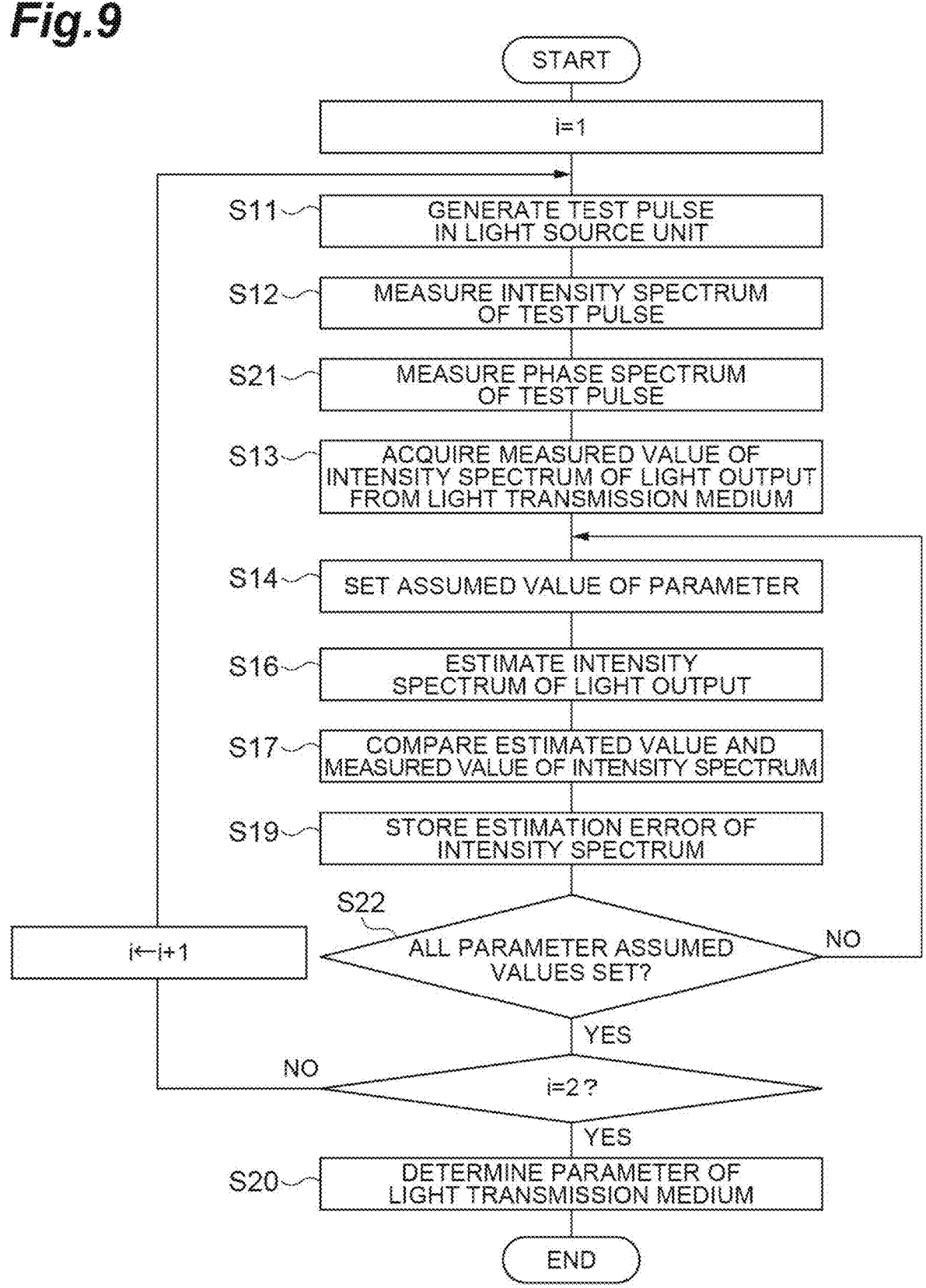
FIG. 9 is a flowchart illustrating a measurement method according to a modification.

FIG. 9 is a flowchart illustrating a measurement method according to a modification of the above embodiment. A difference between the present modification and the above embodiment is a method of acquiring the phase spectrum of the light input. In the above embodiment, the assumed spectrum of the light input is set in the step S15, and the assumed spectrum with which the intensity spectrum estimation error is minimized is used as the phase spectrum of the light input, however, in the present modification, the phase spectrum of the light input is obtained by the measurement.

That is, as illustrated in FIG. 9, after the step S12 (or before the step S12), as a step S21, the phase spectrum of the test pulse generated in the step S11 is measured. Specifically, the test pulse output from the light source unit 2 is input to a phase spectrum measurement apparatus without interposition of the light transmission medium 4, and the measured value of the phase spectrum of the test pulse is acquired in the phase spectrum measurement apparatus. The data of the measured value of the phase spectrum is provided to the parameter calculation unit 6 as the phase spectrum data on the light input.

In addition, the phase spectrum measurement apparatus used here is an apparatus based on a measurement method such as a frequency resolved optical gating (FROG) method, an optical pulse ruler (OPR), and the like. The configuration of the OPR apparatus is obtained by removing the light source 21 and the light property control unit 22 from the configuration of FIG. 1.

Subsequently, as the step S13, the light input by the test pulse is performed to the light transmission medium 4, and the measured value of the intensity spectrum of the light output from the light transmission medium 4 corresponding to the light input is acquired (measured value acquisition step). The details of the step S13 are the same as in the above embodiment.

Subsequently, the parameter calculation unit 6 calculates the estimated value of the intensity spectrum based on the theoretical relation between the intensity spectrum and the phase spectrum of the light input, the nonlinear coefficient and the wavelength dispersion value of the light transmission medium 4, and the intensity spectrum of the light output. In this case, the plurality of estimated values are calculated while individually changing the nonlinear coefficient and the wavelength dispersion value. Further, the error (intensity spectrum estimation error) between the plurality of estimated values and the measured value is calculated (error calculation step, calculation unit in the measurement program).

Specifically, as the step S14, the parameter calculation unit 6 sets the assumed values of the parameters (nonlinear coefficient and wavelength dispersion value) of the light transmission medium 4. Further, as the step S16, the parameter calculation unit 6 estimates the intensity spectrum related to the light output from the theoretical relation based on the assumed values of the nonlinear coefficient and the wavelength dispersion value and the measured value of the phase spectrum.

Then, as the step S17, the parameter calculation unit 6 compares the estimated value of the intensity spectrum related to the light output and the measured value of the intensity spectrum related to the light output. The parameter calculation unit 6 stores the error (intensity spectrum estimation error) of the estimated value with respect to the measured value of the intensity spectrum as the intensity spectrum estimation error corresponding to the nonlinear coefficient and the wavelength dispersion value set in the step S14 (step S19).

Then, the parameter calculation unit 6 returns to the step S14 again (step S22), changes the assumed values of the parameters (nonlinear coefficient and wavelength dispersion value) of the light transmission medium 4, and then repeats the above steps S16, S17, and S19. In this way, the parameter calculation unit 6 calculates the estimated value of the intensity spectrum and the intensity spectrum estimation error corresponding to each assumed value while changing the assumed values of the parameters (nonlinear coefficient and wavelength dispersion value) of the light transmission medium 4.

Then, the process returns to the step S11 again, and the light source unit 2 again generates the test pulse. The test pulse is a light pulse having the same center wavelength as that of the previously generated test pulse and the different property (for example, at least one of intensity spectrum, phase spectrum, and light pulse energy).

After generating the above test pulse, the above steps S12, S13, S14, S16, S17, and S19 are repeated again. Through the above processing, it is possible to acquire the relation between the intensity spectrum estimation error between the estimated value and the measured value of the intensity spectrum, and the nonlinear coefficient and the wavelength dispersion value for the two test pulses having the same center wavelength and different properties. In addition, the details of the next step S20 are the same as in the above embodiment, and thus the description thereof will be omitted.

As in the present modification, before the steps S14 to S19, the step S21 for acquiring the measured value of the phase spectrum of the light input may be performed. In this case, the calculation of the step S20 can be performed based on the accurate phase spectrum, and the nonlinear coefficient and the wavelength dispersion value of the light transmission medium 4 can be acquired more accurately.

Second Modification

In the above embodiment, as an example of making the properties of the plurality of light inputs different from each other, the intensity spectra of the plurality of light inputs are made different from each other as shown in (a) in FIG. 4 and (a) in FIG. 5, but the property of the light input to be made different is not limited to the intensity spectrum, as long as the relation between the nonlinear coefficient and the wavelength dispersion value and the intensity spectrum estimation error differs between the plurality of light inputs.

For example, the phase spectra of the plurality of light inputs may be different from each other, the peak intensities of the plurality of light inputs may be different from each other, or the light pulse energies of the plurality of light inputs may be different from each other. Further, two or more properties in various properties such as the intensity spectrum, the phase spectrum, the peak intensity, and the light pulse energy may be different between the plurality of light inputs. When the phase spectra of the plurality of light inputs are different from each other, the phase spectrum of one of the light inputs may have a flat shape in the wavelength range of the intensity spectrum.

Even in the above cases, the relation between the nonlinear coefficient and the wavelength dispersion value and the intensity spectrum estimation error is different between the plurality of light inputs. Thus, as in the above embodiment, the nonlinear coefficient and the wavelength dispersion value of the light transmission medium 4 can be determined accurately.

The light transmission medium measurement method, the light transmission medium measurement apparatus, the light transmission medium measurement program, and the recording medium are not limited to the embodiments and configuration examples described above, and various modifications are possible.

For example, the light pulse is used as the light input in the above embodiment, and further, continuous light may be used as the light input. Further, in the above embodiment, the relation between the nonlinear coefficient and the wavelength dispersion value, and the intensity spectrum estimation error is linear, and further, even when the relation is nonlinear, the effects according to the present disclosure can be suitably obtained.

The light transmission medium measurement method of the above embodiment is a method for measuring a nonlinear coefficient and a wavelength dispersion value of a light transmission medium, and includes a measured value acquisition step of performing a plurality of light inputs with the same center wavelength and different properties to the light transmission medium, and acquiring a measured value of an intensity spectrum of each of a plurality of light outputs from the light transmission medium respectively corresponding to the plurality of light inputs; an error calculation step of calculating an error between the measured value and an estimated value of the intensity spectrum calculated based on a theoretical relation between an intensity spectrum and a phase spectrum of each of the plurality of light inputs, the nonlinear coefficient and the wavelength dispersion value of the light transmission medium, and the intensity spectrum of each of the plurality of light outputs while changing the nonlinear coefficient and the wavelength dispersion value; and a parameter determination step of determining the nonlinear coefficient and the wavelength dispersion value of the light transmission medium based on a difference, in a relation between the nonlinear coefficient and the wavelength dispersion value and the error, between the plurality of light inputs caused by a difference in the property.

The light transmission medium measurement apparatus of the above embodiment is an apparatus for measuring a nonlinear coefficient and a wavelength dispersion value of a light transmission medium, and includes a light source unit for performing a plurality of light inputs with the same center wavelength and different properties to the light transmission medium; a spectrum acquisition unit for acquiring a measured value of an intensity spectrum of each of a plurality of light outputs from the light transmission medium respectively corresponding to the plurality of light inputs; and an operation unit for calculating an error between the measured value and an estimated value of the intensity spectrum calculated based on a theoretical relation between an intensity spectrum and a phase spectrum of each of the plurality of light inputs, the nonlinear coefficient and the wavelength dispersion value of the light transmission medium, and the intensity spectrum of each of the plurality of light outputs while changing the nonlinear coefficient and the wavelength dispersion value, and determining the nonlinear coefficient and the wavelength dispersion value of the light transmission medium based on a difference, in a relation between the nonlinear coefficient and the wavelength dispersion value and the error, between the plurality of light inputs caused by a difference in the property.

The light transmission medium measurement program of the above embodiment is a program for measuring a nonlinear coefficient and a wavelength dispersion value of a light transmission medium, and causes a computer to function as a calculation unit for calculating an error between an estimated value of an intensity spectrum calculated based on a theoretical relation between an intensity spectrum and a phase spectrum of each of a plurality of light inputs with the same center wavelength and different properties, the nonlinear coefficient and the wavelength dispersion value of the light transmission medium, and the intensity spectrum of each of a plurality of light outputs from the light transmission medium respectively corresponding to the plurality of light inputs, and a measured value of the intensity spectrum of each of the plurality of light outputs while changing the nonlinear coefficient and the wavelength dispersion value; and a determination unit for determining the nonlinear coefficient and the wavelength dispersion value of the light transmission medium based on a difference, in a relation between the nonlinear coefficient and the wavelength dispersion value and the error, between the plurality of light inputs caused by a difference in the property.

The recording medium of the above embodiment is a computer readable medium recording the light transmission medium measurement program described above.

In the above measurement method, in the parameter determination step, a combination of the nonlinear coefficient and the wavelength dispersion value causing the error to approach a minimum value may have a linear relation, and the nonlinear coefficient and the wavelength dispersion value of the light transmission medium may be determined based on a plurality of linear relations respectively corresponding to the plurality of light inputs.

In the above measurement apparatus, a combination of the nonlinear coefficient and the wavelength dispersion value causing the error to approach a minimum value may have a linear relation, and the operation unit may determine the nonlinear coefficient and the wavelength dispersion value of the light transmission medium based on a plurality of linear relations respectively corresponding to the plurality of light inputs.

According to the above configuration, the nonlinear coefficient and the wavelength dispersion value of the light transmission medium can be easily obtained.

The above measurement method may further include a step of acquiring a measured value of the phase spectrum of each light input before the error calculation step. In this case, the above calculation can be performed based on the accurate phase spectrum, and the nonlinear coefficient and the wavelength dispersion value of the light transmission medium can be acquired more accurately.

In the above measurement method, in the error calculation step, a relation between the error and an assumed spectrum may be obtained by changing the assumed spectrum of the phase spectrum input to the theoretical relation, and the estimated value may be calculated using the assumed spectrum with which the error is minimized as the phase spectrum of each light input.

In the above measurement apparatus, the operation unit may obtain a relation between the error and an assumed spectrum by changing the assumed spectrum of the phase spectrum input to the theoretical relation, and may calculate the estimated value using the assumed spectrum with which the error is minimized as the phase spectrum of each light input.

According to the above configuration, the above measurement can be performed using the light whose phase spectrum is unknown, and the measurement of the phase spectrum can be omitted, and thus, it is possible to reduce time and effort required for measuring the nonlinear coefficient and the wavelength dispersion value.

In the above measurement method and the measurement apparatus, the intensity spectra of the plurality of light inputs may be different from each other. According to the research of the present inventors, in this case, the relation between the nonlinear coefficient and the wavelength dispersion value and the error greatly differs between the plurality of light inputs. Thus, the nonlinear coefficient and the wavelength dispersion value of the light transmission medium can be determined more accurately.

Further, in the above case, the phase spectrum of each of the plurality of light inputs may be flat within a wavelength range of the intensity spectrum. According to the research of the present inventors, the relationship between the nonlinear coefficient and the wavelength dispersion value and the error becomes clearer, and thus, the nonlinear coefficient and the wavelength dispersion value of the light transmission medium can be determined more accurately.

In the above measurement method and the measurement apparatus, the phase spectra of the plurality of light inputs may be different from each other. In this case also, the relation between the nonlinear coefficient and the wavelength dispersion value and the error differs between the plurality of light inputs. Thus, the nonlinear coefficient and the wavelength dispersion value of the light transmission medium can be determined accurately.

In the above measurement method, in the measured value acquisition step, the plurality of light inputs may be performed while changing the property of light output from a common light source.

In the above measurement apparatus, the light source unit may include a light source for outputting light having a predetermined property; and a light property control unit for performing the plurality of light inputs while changing the property of the light output from the light source.

According to the above configuration, the plurality of light inputs can be performed using a single light source, and thus, the configuration necessary for the measurement can be simplified.

INDUSTRIAL APPLICABILITY

The embodiments can be used as a light transmission medium measurement method, a light transmission medium measurement apparatus, a light transmission medium measurement program, and a recording medium capable of accurately acquiring a nonlinear coefficient and a wavelength dispersion value of a light transmission medium.

REFERENCE SIGNS LIST

1A—light transmission medium measurement apparatus, 2—light source unit, 2a—output end, 4—light transmission medium, 4a—one end, 4b—the other end, 5—spectrum acquisition unit, 5a—input end, 5b—signal output end, 6—parameter calculation unit, 6a—signal input end, 21—light source, 21a—output end, 22—light property control unit, 22a—input end, 22b—output end, $B_1$, $B_2$—region, G1, G2—approximate straight line, $\Lambda_1$, $\Lambda_2$—wavelength range.

The invention claimed is:

1. A light transmission medium measurement method for measuring a nonlinear coefficient and a wavelength dispersion value of a light transmission medium, the method comprising:
performing a measured value acquisition of performing, using at least one light source optically coupled to a light transmission medium, a plurality of light inputs with the same center wavelength and different properties to the light transmission medium, and acquiring, using at least one light detector optically coupled to the light transmission medium, a measured value of an intensity spectrum of each of a plurality of light outputs from the light transmission medium respectively corresponding to the plurality of light inputs;
performing an error calculation of calculating an error between the measured value and an estimated value of the intensity spectrum calculated based on a theoretical relation between an intensity spectrum and a phase spectrum of each of the plurality of light inputs, the nonlinear coefficient and the wavelength dispersion value of the light transmission medium, and the intensity spectrum of each of the plurality of light outputs while changing the nonlinear coefficient and the wavelength dispersion value; and
performing a parameter determination of determining the nonlinear coefficient and the wavelength dispersion value of the light transmission medium based on a difference, in a relation between the nonlinear coefficient and the wavelength dispersion value and the error, between the plurality of light inputs caused by a difference in the property.

2. The light transmission medium measurement method according to claim 1, wherein in the parameter determination, a combination of the nonlinear coefficient and the wavelength dispersion value causing the error to approach a minimum value has a linear relation, and the nonlinear coefficient and the wavelength dispersion value of the light transmission medium are determined based on a plurality of linear relations respectively corresponding to the plurality of light inputs.

3. The light transmission medium measurement method according to claim 1, further comprising acquiring a measured value of the phase spectrum of each light input before the error calculation.

4. The light transmission medium measurement method according to claim 1, wherein in the error calculation, a relation between the error and an assumed spectrum is obtained by changing the assumed spectrum of the phase spectrum input to the theoretical relation, and the estimated value is calculated using the assumed spectrum with which the error is minimized as the phase spectrum of each light input.

5. The light transmission medium measurement method according to claim 1, wherein the intensity spectra of the plurality of light inputs are different from each other.

6. The light transmission medium measurement method according to claim 5, wherein the phase spectrum of each of the plurality of light inputs is flat within a wavelength range of the intensity spectrum.

7. The light transmission medium measurement method according to claim 1, wherein the phase spectra of the plurality of light inputs are different from each other.

8. The light transmission medium measurement method according to claim 1, wherein in the measured value acquisition, the plurality of light inputs are performed while changing the property of light output from the at least one light source.

9. A light transmission medium measurement apparatus for measuring a nonlinear coefficient and a wavelength dispersion value of a light transmission medium, the apparatus comprising:
a light source unit configured to perform, using at least one light source optically coupled to a light transmission medium, a plurality of light inputs with the same center wavelength and different properties to the light transmission medium;
a spectrum acquisition unit configured to acquire, using at least one light detector optically coupled to the light transmission medium, a measured value of an intensity spectrum of each of a plurality of light outputs from the light transmission medium respectively corresponding to the plurality of light inputs; and
an operation unit configured to calculate an error between the measured value and an estimated value of the intensity spectrum calculated based on a theoretical relation between an intensity spectrum and a phase spectrum of each of the plurality of light inputs, the nonlinear coefficient and the wavelength dispersion value of the light transmission medium, and the intensity spectrum of each of the plurality of light outputs while changing the nonlinear coefficient and the wavelength dispersion value, and determine the nonlinear coefficient and the wavelength dispersion value of the light transmission medium based on a difference, in a relation between the nonlinear coefficient and the wavelength dispersion value and the error, between the plurality of light inputs caused by a difference in the property.

10. The light transmission medium measurement apparatus according to claim 9, wherein a combination of the nonlinear coefficient and the wavelength dispersion value causing the error to approach a minimum value has a linear relation, and the operation unit is configured to determine the nonlinear coefficient and the wavelength dispersion value of the light transmission medium based on a plurality of linear relations respectively corresponding to the plurality of light inputs.

11. The light transmission medium measurement apparatus according to claim 9, wherein the operation unit is configured to obtain a relation between the error and an assumed spectrum by changing the assumed spectrum of the phase spectrum input to the theoretical relation, and calculate the estimated value using the assumed spectrum with which the error is minimized as the phase spectrum of each light input.

12. The light transmission medium measurement apparatus according to claim 9, wherein the intensity spectra of the plurality of light inputs are different from each other.

13. The light transmission medium measurement apparatus according to claim 12, wherein the phase spectrum of each of the plurality of light inputs is flat within a wavelength range of the intensity spectrum.

14. The light transmission medium measurement apparatus according to claim 9, wherein the phase spectra of the plurality of light inputs are different from each other.

15. The light transmission medium measurement apparatus according to claim 9, wherein
the light source unit includes:
the at least one light source configured to output light having a predetermined property; and
a light property control unit configured to perform, using the at least one light source, the plurality of light inputs while changing the property of the light output from the at least one light source.

16. A non-transitory computer readable recording medium storing a light transmission medium measurement program for measuring a nonlinear coefficient and a wavelength dispersion value of a light transmission medium, the program causing a computer to:
perform a measured value acquisition of performing, using at least one light source optically coupled to a light transmission medium, a plurality of light inputs with the same center wavelength and different properties to the light transmission medium, and acquire, using at least one light detector optically coupled to the light transmission medium, a measured value of an intensity spectrum of each of a plurality of light outputs from the light transmission medium respectively corresponding to the plurality of light inputs;
calculate an error between the measured value and an estimated value of the intensity spectrum calculated based on a theoretical relation between an intensity spectrum and a phase spectrum of each of the plurality of light inputs, the nonlinear coefficient and the wavelength dispersion value of the light transmission medium, and the intensity spectrum of each of the plurality of light outputs while changing the nonlinear coefficient and the wavelength dispersion value; and
determine the nonlinear coefficient and the wavelength dispersion value of the light transmission medium based on a difference, in a relation between the nonlinear coefficient and the wavelength dispersion value and the error, between the plurality of light inputs caused by a difference in the property.

* * * * *